US010282186B2

(12) United States Patent
Judge et al.

(10) Patent No.: US 10,282,186 B2
(45) Date of Patent: May 7, 2019

(54) MANAGING SOFTWARE SUITE COMPONENT VERSIONS

(71) Applicant: BlackBerry Limited, Waterloo (CA)

(72) Inventors: Francis Patrick Judge, Andover, MA (US); Katerina Doudkin, Andover, MA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/304,266

(22) Filed: Jun. 13, 2014

(65) Prior Publication Data
US 2015/0363186 A1 Dec. 17, 2015

(51) Int. Cl.
*G06F 8/61* (2018.01)
*G06F 8/65* (2018.01)
*G06F 8/71* (2018.01)
*G06F 17/30* (2006.01)
*G06F 8/70* (2018.01)

(52) U.S. Cl.
CPC ............ *G06F 8/65* (2013.01); *G06F 8/61* (2013.01); *G06F 8/71* (2013.01); *G06F 8/70* (2013.01)

(58) Field of Classification Search
CPC ............ G06F 8/71; G06F 17/30292; G06F 17/30297; G06F 17/30294; G06F 8/65; G06F 8/62; G06F 8/75; G06F 8/61; G06F 8/70
USPC ........................................................ 717/170
See application file for complete search history.

(56) References Cited

U.S. PATENT DOCUMENTS

| 7,415,706 B1* | 8/2008 | Raju | G06F 9/44536 717/170 |
| 7,698,702 B2* | 4/2010 | Wetherly | G06F 8/65 717/170 |
| 7,752,597 B2* | 7/2010 | Pontoppidan | G06F 8/71 717/106 |

(Continued)

FOREIGN PATENT DOCUMENTS

EP    1739552 A1    1/2007

OTHER PUBLICATIONS

Mednieks, Zigurd, Laird Dornin, G. Blake Meike, and Masumi Nakamura. "Programming Android, 2nd Edition." Oct. 12, 2012. O'Reilly Media, Inc. 2nd Edition, p. 1. Retrieved from Safari Books Online on Feb. 23, 2018.*

(Continued)

*Primary Examiner* — Emerson C Puente
*Assistant Examiner* — Erika Kretzmer
(74) *Attorney, Agent, or Firm* — Conley Rose, P.C.; J. Robert Brown, Jr.; Joseph J. Funston, III (57) ABSTRACT

A component manager may be used to install or upgrade components of a software suite. The component manager may be installed via an application store of an electronic device. The component manager may determine a plurality of applications to install or upgrade based at least in part on the versions of the applications, a version numbering scheme, and changes to a database schema associated with the software suite. The version numbering scheme is designed to maintain compatibility between the applications in the software suite. The component manager may install the plurality of applications and/or upgrade a database schema in order to maintain compatibility between the components of the software suite.

15 Claims, 8 Drawing Sheets

(56) References Cited

U.S. PATENT DOCUMENTS

| | | | | |
|---|---|---|---|---|
| 7,945,906 B2 * | 5/2011 | Bourke-Dunphy | ....... | G06F 8/61 717/170 |
| 8,276,121 B2 * | 9/2012 | Miller | ....... | G06F 8/71 717/120 |
| 8,601,467 B2 * | 12/2013 | Hofhansl | ....... | G06F 8/71 717/120 |
| 8,607,187 B2 * | 12/2013 | Kemmler | ....... | G06F 8/71 717/100 |
| 9,477,462 B2 * | 10/2016 | Felts | ....... | G06F 8/71 |
| 2003/0182652 A1 * | 9/2003 | Custodio | ....... | G06F 8/62 717/122 |
| 2005/0265247 A1 * | 12/2005 | Bourke-Dunphy | ....... | G06F 8/61 370/249 |
| 2006/0236317 A1 * | 10/2006 | Wetherly | ....... | G06F 8/65 717/168 |
| 2007/0006222 A1 * | 1/2007 | Maier | ....... | G06F 8/61 717/174 |
| 2007/0240096 A1 * | 10/2007 | Pontoppidan | ....... | G06F 8/71 717/101 |
| 2008/0201701 A1 * | 8/2008 | Hofhansl | ....... | G06F 8/71 717/168 |
| 2008/0320460 A1 * | 12/2008 | Miller | ....... | G06F 8/71 717/162 |
| 2009/0183150 A1 * | 7/2009 | Felts | ....... | G06F 8/71 717/173 |
| 2012/0167034 A1 * | 6/2012 | Kemmler | ....... | G06F 8/71 717/102 |

OTHER PUBLICATIONS

European Extended Search Report; Application No. 15171532.3; dated Oct. 29, 2015; 9 pages.

Canadian Office Action; Application No. 2,894,094; dated Apr. 29, 2016; 4 pages.

Canadian Office Action; Application No. 2,894,094; dated Mar. 3, 2017; 5 pages.

European Examination Report; Application No. 15171532.3; dated Sep. 11, 2017; 4 pages.

Canadian Office Action; Application No. 2,894,094; dated Feb. 6, 2018; 5 pages.

Canadian Office Action; Application No. 2,894,094; dated Jan. 28, 2019; 6 pages.

* cited by examiner

VERSION NUMBERING SCHEME 510  515  520  525  530  535  540

COMPONENT VERSION EXAMPLE #1

| APPLICATION 1 | 2.0.1.100 |
| APPLICATION 2 | 2.0.8.20 --UPGRADE--> 2.0.9.1 ～ 610 |
| APPLICATION 3 | 2.0.5.300 |
| APPLICATION 4 | 2.0.9.54 |

602 →

COMPONENT VERSION EXAMPLE #2

| APPLICATION 1 | 2.0.1.100 | CHECK FOR UPGRADE |
| APPLICATION 2 | 2.0.8.20 | --UPGRADE--> 2.1.1.1  ⎫ 620 |
| APPLICATION 3 | 2.0.5.300 | CHECK FOR UPGRADE ⎬ 630 |
| APPLICATION 4 | 2.0.9.54 | CHECK FOR UPGRADE ⎭ |

MANAGING SOFTWARE SUITE COMPONENT VERSIONS

BACKGROUND

Embodiments of the inventive subject matter generally relate to the field of electronic devices, and, more particularly, to managing software on an electronic device.

Electronic devices (such as mobile devices, smartphones, tablet computers, etc.) can be configured to allow different types of applications to execute thereon. The applications can be pre-installed or downloaded over a network. For example, the applications can be downloaded from an application distribution platform, referred to as an application store, which may be integrated with an operating system of the electronic device. These applications are typically tailored to the screen size and the hardware for the particular electronic device.

Figure 1:
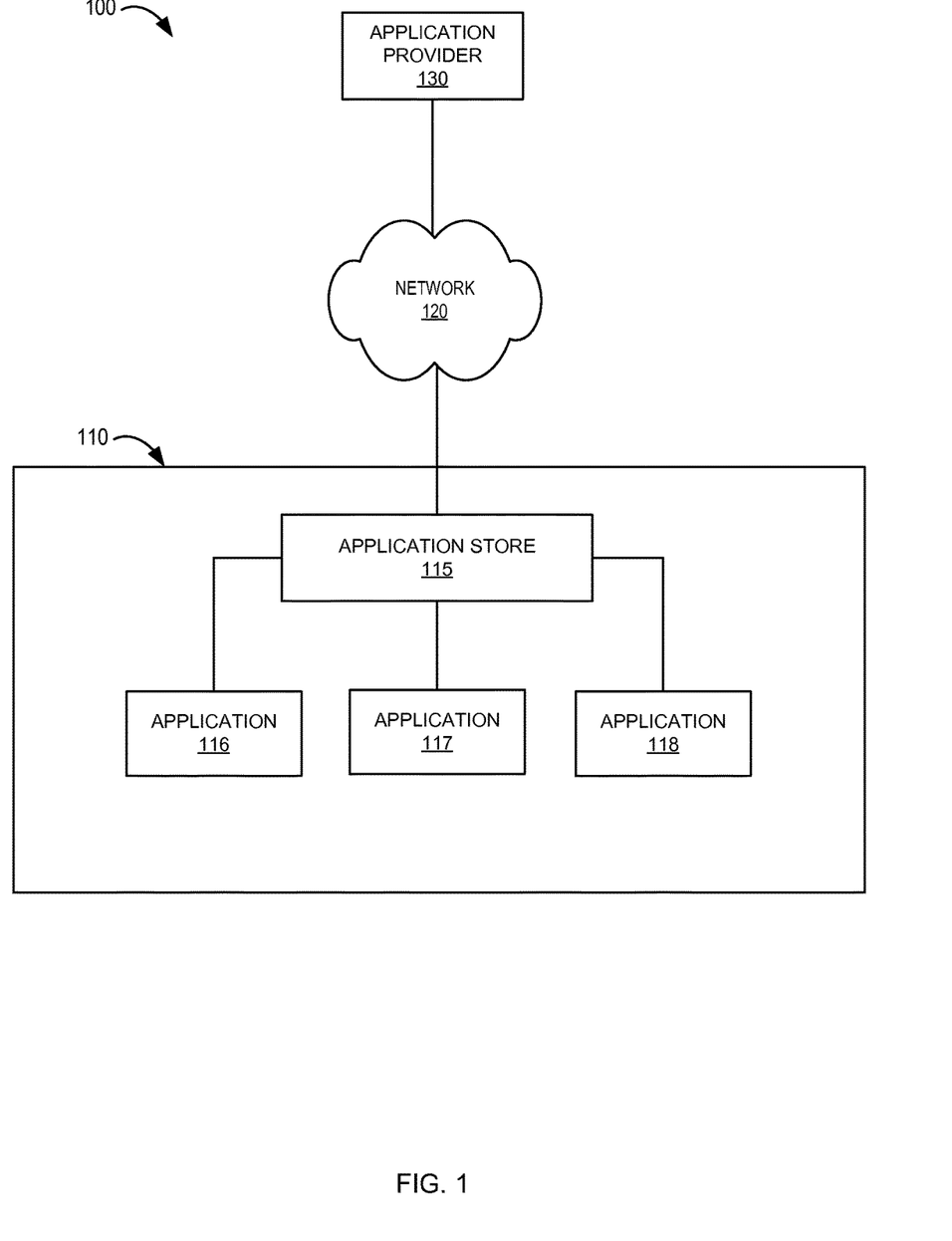
FIG. 1 depicts an example system in which an application store manages installation of several applications.

Referring to FIG. 1, an application store 115 may be designed to download and install applications 116, 117, 118 from an application provider 130 via a network 120. Typically the applications 116, 117, 118 are separate applications with little or no version dependency between the applications 116, 117, 118. Therefore, the application store 115 may not consider version upgrades for application 116 when installing application 117. Furthermore, the application store 115 may be unaware of any shared services or inter-process communication between the applications 116, 117, 118. Maintaining compatibility of applications may be difficult due to limitations of the application store 115 to manage version dependencies in a suite of applications.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

A software developer may prepare a collection of applications that form a software suite. The software suite may comprise many components, such as applications, drivers, database components, libraries, or other binaries, which work together as part of the software suite. For example, a personal information management (PIM) software suite may include an email application, contacts application, calendar application, task application, etc. The software suite may be distributed as a collection of several binary, executable files (referred to as "binaries") which are installed on an electronic device. Furthermore, the software suite may be associated with one or more databases which can be accessed by the applications. It may be possible for multiple applications to access a same database, or for a single application to access multiple databases.

Managing the compatibility between the components of a software suite is desirable to provide a quality user experience. In accordance with this disclosure, a component manager may be used to install or upgrade components of a software suite. The component manager may be installed via an application store of an electronic device. In one embodiment, the component manager may not include the binaries for the components of the software suite, but may retrieve the binaries upon determining the components and versions that are needed to be installed. For example, the component manager may determine versions of applications in a software suite. The component manager may determine a plurality of applications to install or upgrade based at least in part on the versions of the applications and a version numbering scheme. The version numbering scheme is designed to maintain compatibility between the applications in the software suite. The component manager may install the plurality of applications and/or upgrade a database schema in order to maintain compatibility between the components of the software suite.

Returning to the example system 100 of FIG. 1, an application store 115 may treat each installed application 116, 117, 118 as a separate application having no relation to the other. For example, in the Android™ operating system, an application store, may use an Android application file (APK) to distribute and install an application. However, there may be a size limit (e.g., 50 Mb) to the APK making it impractical for larger applications or software suites. Furthermore, the application store 115 may not recognize dependencies between APKs associated with different applications in the application store 115.

A software developer may create custom code linking legacy applications, such as applications 116, 117, 118. However, the application store 115 may not be aware of the custom code or any version dependencies between the applications. An end user may upgrade one of the applications 116 via the application store 115, not knowing whether the upgrade to application 116 will cause problems for the other applications 116, 118. Additionally, when two or more applications share a common library or database, an upgrade to one of the applications may cause database schema changes that may negatively impact another application.

Figure 2:
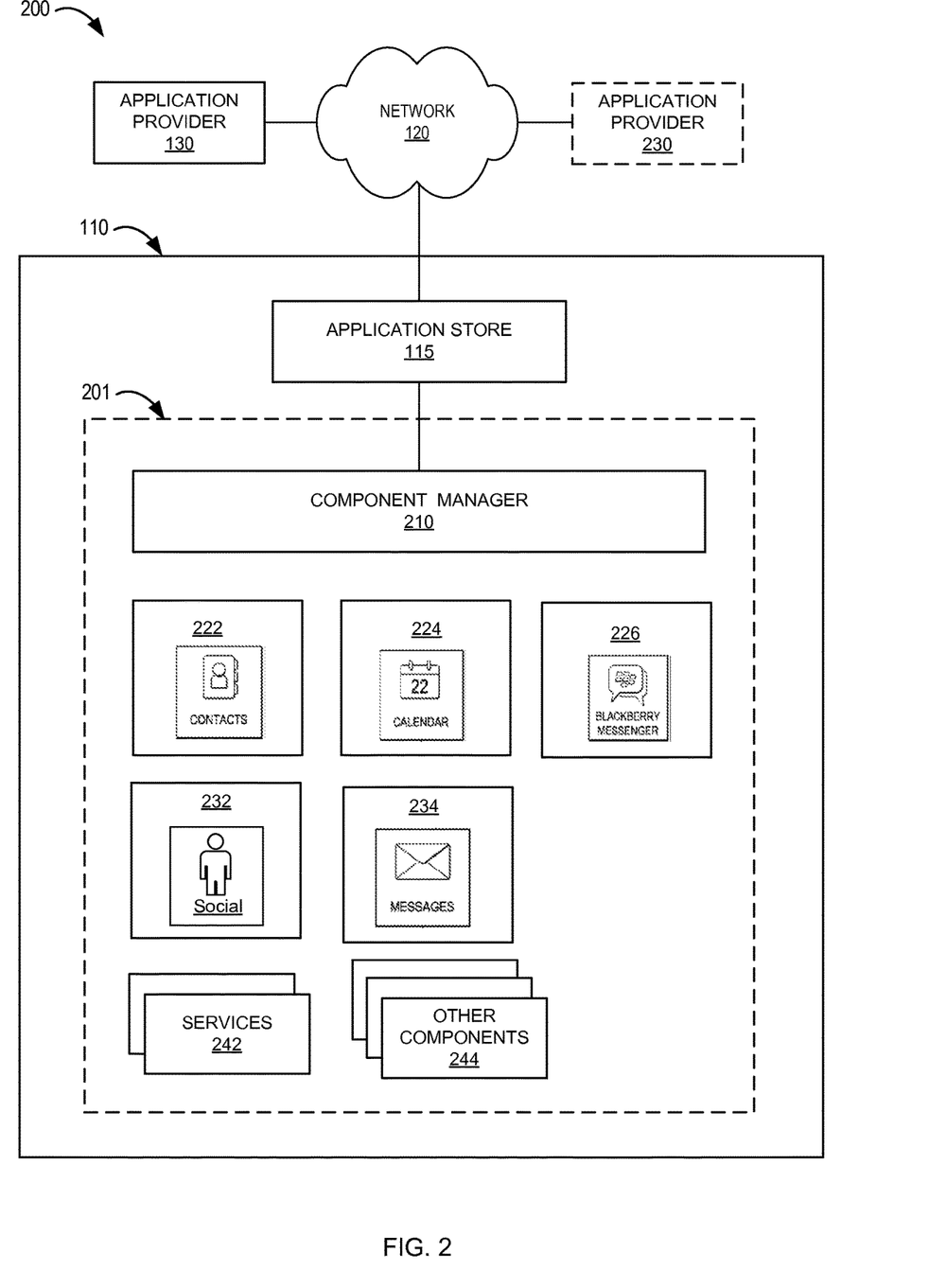
FIG. 2 depicts an example system in which a component manager manages installation of several applications associated with a software suite in accordance with an embodiment of this disclosure.

FIG. 2 depicts an example system 200 in which a component manager 210 manages installation of several components associated with a software suite 201 in accordance with an embodiment of this disclosure. The example system 200 includes a device 110 which has an application store 115 configured to download and install applications from an application provider 130 via a network 120.

To install the software suite 201, a component manager 210 may be installed. For example, the application store 115 may present a list of games, applications, books, etc., selectable by a user. The list may include the component manager 210 as an installer application that will install one or more components of the software suite 201. Responsive to a user selection, the application store 115 may install the component manager 210. In one embodiment, the APK associated with the component manager 210 may not include binaries or application files for the component applications. Rather, the APK associated with the component manager 210 may only include the code used by the component manager 210 to download and install the further components.

In the example of FIG. 2, the software suite 201 may include a first application 222 (e.g., "contacts" application), a second application 224 (e.g., "calendar" application), a third application 226 (e.g., a messenger application), a fourth application 232 (e.g., a social networking application), and a fifth application 234 (e.g., an "email" application). It should be noted that the software suite 201 may include fewer or more application components, and that the examples in FIG. 2 are merely examples for illustrative purposes. The software suite 201 may also include other binaries, such as service 242 or other components 244. A software developer of the software suite 201 may have flexibility to move functionality from the applications to the other component 244 as part of a software architecture.

In one embodiment, the component manager 210 may invoke a process of the application store 115 to download and install the components of the software suite 201. In another embodiment, the component manager 210 may download the components from another application provider 230, separately from the application store 115.

The component manager 210 may present options to a user of the device 110 to determine which components to install. For example, the component manager 210 may present a user interface wherein a user can select a feature set or subset of applications that are desired. The component manager 210 may download a list of potential applications and allow the user to select which of the potential applications to install, prior to downloading the installation files for the selected applications.

The component manager 210 may also verify compatibility among the selected applications. For example, the component manager 210 may determine which applications are compatible with the device 110, or which versions of the applications may be used together.

The component manager 210 may also be used to manage upgrades of the components of the software suite 201. For example, the component manager 210 may check for upgrades periodically by downloading an available versions list from a centralized server. If an upgrade is available, the component manager 210 may present the option to upgrade via a user interface. The component manager 210 may also determine which other software components will need to be upgraded in order to maintain compatibility among the applications. In one embodiment, a version scheme, such as the version scheme described in FIG. 5, may aid the component manager 210 in determining the necessary upgrades without having to maintain a large compatibility/dependency database.

When upgrading one or more applications of the software suite 201, the component manager 210 may also cause database upgrades that are associated with the application upgrades. The component manager 210 may cause an already installed application to shut down during the upgrade process, and may trigger the application to restart upon completing the upgrade process. The component manager 210 may launch subroutine or process in an upgraded application to cause the upgraded application to complete an upgrade process.

Figure 3:
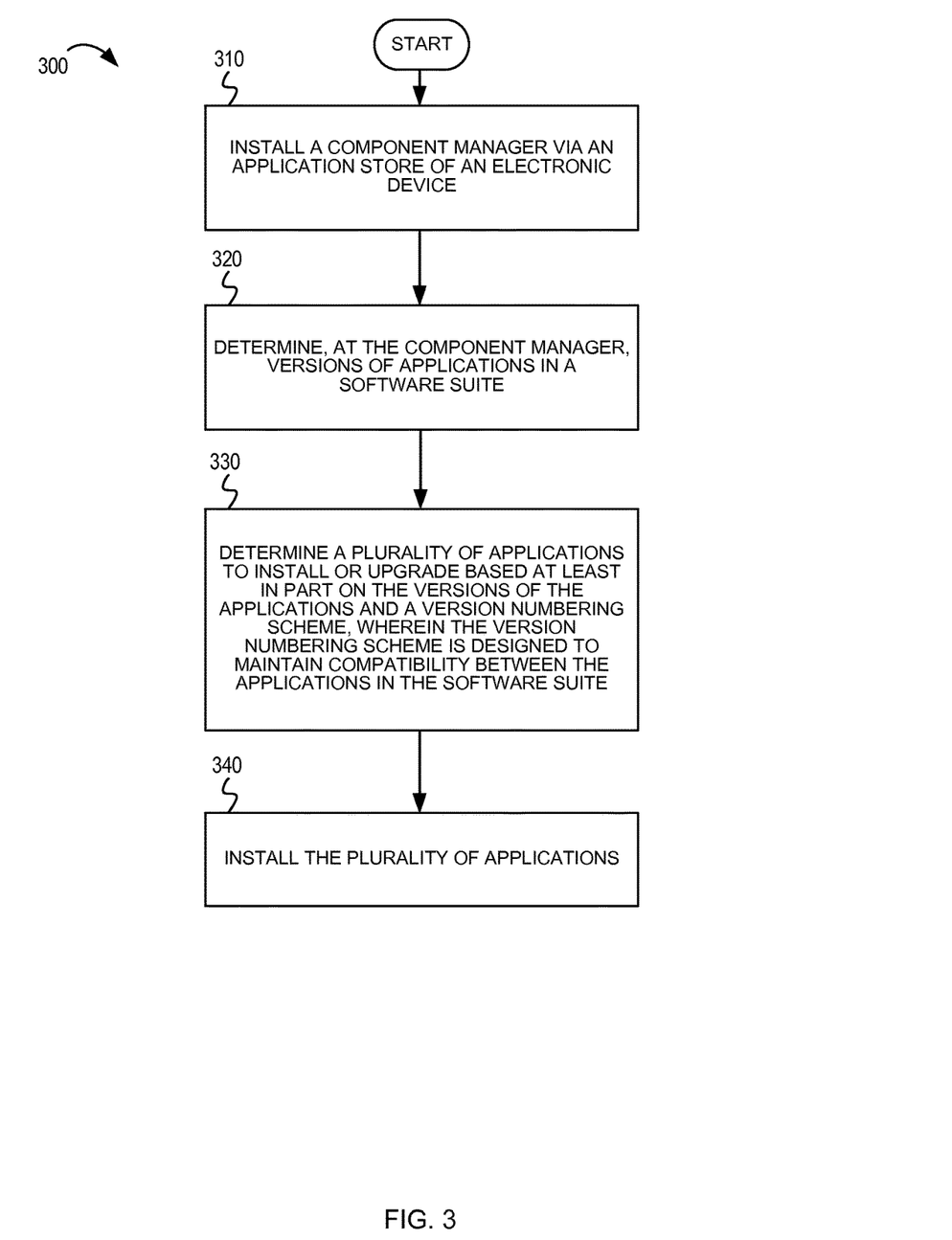
FIG. 3 depicts a flowchart with example operations for managing software components in accordance with an embodiment of this disclosure.

FIG. 3 depicts a flowchart 300 with example operations for managing software components in accordance with an embodiment of this disclosure.

At block 310, the electronic device may install a component manager via an application store. At block 320, the component manager may determine versions of applications in a software suite. For example, the component manager may query a list of installed applications on the electronic device, and catalog the versions of the applications associated with the software suite. The component manager may also determine available versions for the applications associated with the software suite by downloading a current version list from a centralized server.

At block 330, the component manager may determine a plurality of applications to install or upgrade based at least in part on the versions of the applications and a version numbering scheme. The version numbering scheme is designed to maintain compatibility between the applications in the software suite. In one embodiment, the version numbering scheme may be defined to include at least a first portion of a version number as a suite-specific version number and second portion of the version number as an application-specific version number. An application can be independently upgraded if the application-specific version number changes and the suite-specific version number does not change. If the suite-specific version number changes for one of the applications, the component manager may determine that multiple applications should be upgraded.

At block 340, the component manager may install the plurality of applications determined in block 330. As described above, the applications may be shut down or disabled during the install/upgrade process.

Figure 4:
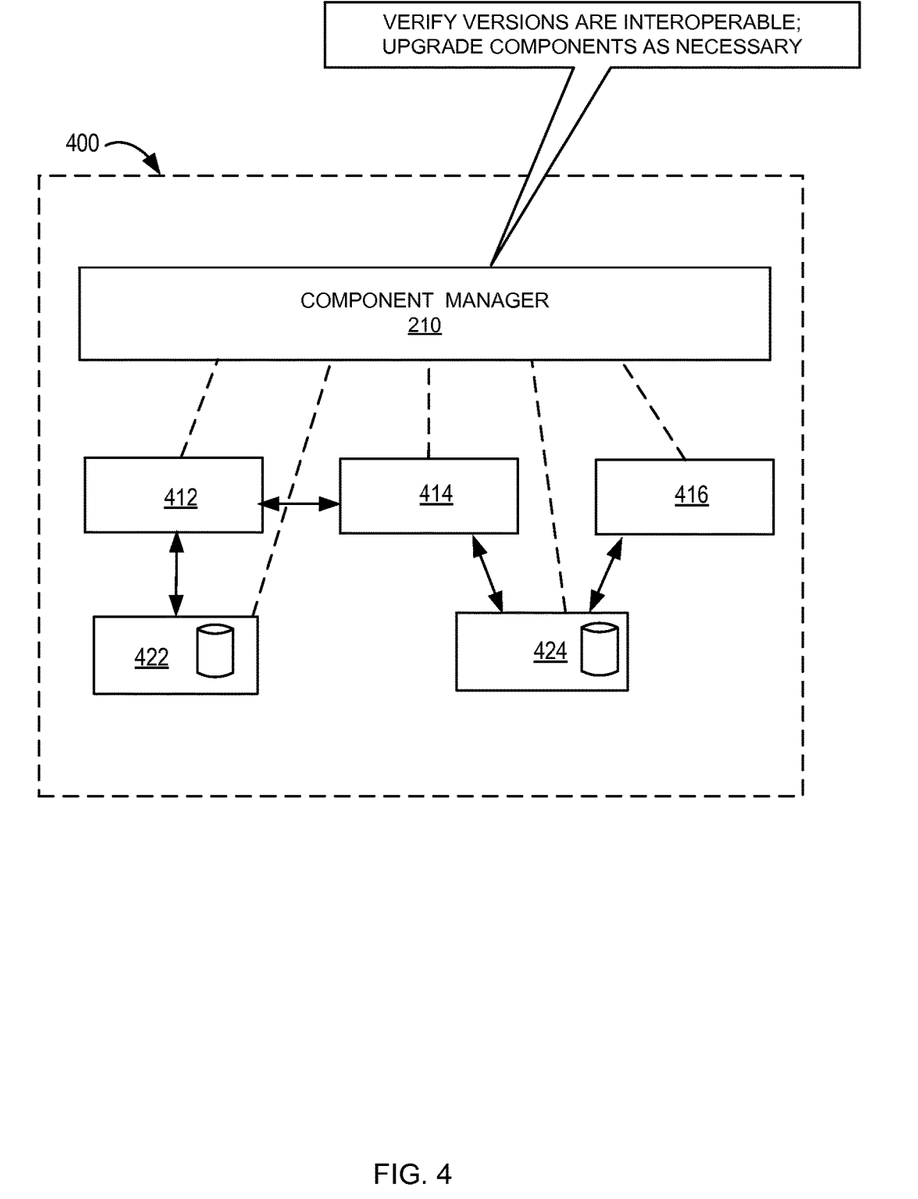
FIG. 4 illustrates cross-application dependencies in accordance with an embodiment of this disclosure.

FIG. 4 illustrates cross-application dependencies in accordance with an embodiment of this disclosure. In FIG. 4, a software suite 400 includes a component manager 210 and several constituent components: a first application 412, a second application 414, a third application 416, a first database 422 and a second database 424. It is noted that there may or may not be a one-to-one relationship between databases and applications. For example, the first application 412 may access the first database 422. The second application 414 and the third application 416 may both be configured to access the second database 424. FIG. 4 also shows a relationship between first application 412 and second application 414. For example, first application 412 may be configured to interact with the second application 414 via an application programming interface (API). The first application 412 and second application 414 may have a version dependency on each other to make sure that changes to the API are carried through to both the first application 412 and second application 414.

The component manager 210 may be configured to determine the version number associated with each of the components to verify that the versions are compatible. The component manager 210 may upgrade components as necessary. When one component is upgraded, the component manager 210 may determine what, if any, upgrades are needed for the other components to make sure that the components are compatible. For example, if the second database 424 has a database schema upgrade, the component manager 210 may determine to upgrade the second application 414 and third application 416 because those applications access the second database 424. Upon determining to upgrade the second application 414, the component manager 210 may also determine to upgrade the first application 412 due to potential changes to the API between those applications.

It is noted that the component manager 210 does not always upgrade all components of the software suite 400. A software developer may build a version upgrade that does not impact a database interface or API. Using the example of FIG. 4, it may be possible that an upgrade to second application 414 can be performed without impacting the first application 412 or the second database 424. The component manager 210 is configured to determine a subset of the components that are related and upgrade the impacted components. In one embodiment, the component manager 210 may maintain software version compatibility by relying on a version numbering scheme.

Figure 5:
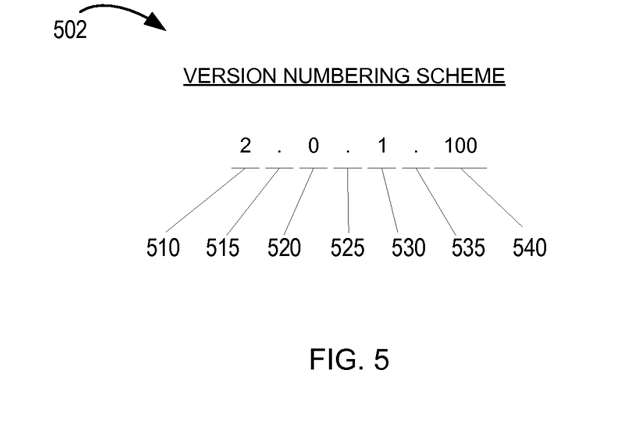
FIG. 5 depicts a version numbering scheme in accordance with an embodiment of this disclosure.

FIG. 5 depicts a version numbering scheme 502 in accordance with an embodiment of this disclosure. The version numbering scheme may be used to generate version numbers for each of the components of a software suite. For example, each application may be associated with a different version number.

In the example version numbering scheme 502, a first number may indicate a major version number 510 (e.g., "2" in the example version number in FIG. 5). A second number may indicate a minor version number 520 (e.g., "0" in the example version number in FIG. 5). A third number may indicate a point version number 530 (e.g., "1" in the example version number in FIG. 5). A fourth number may indicate a build version number 540 (e.g., "100" in the example version number in FIG. 5). It should be understood that letters, or alphanumeric values, could be used instead of numbers in some embodiments. Furthermore, the version number may include one or more delimiters 515, 525, 535 between the parts of the version number. In other embodiments, the version numbering scheme may omit parts of the example version number scheme 502, or may include additional parts.

To aid the component manager in managing version numbers across a plurality of applications, the version numbering scheme may be defined into portions. For example, at least a first portion of the version number may be defined as a suite-specific version number. A second portion of the version number may be defined as an application-specific version number.

The software developer may increment the suite-specific version number whenever a database interface, API, or other public interface of an application changes. Ideally, the change to a public interface would be done so that it is backward compatible to other earlier versions of other component applications. However, by incrementing the suite-specific version number on a particular application, the component manager can determine that an upgrade to that particular application may require upgrades of other applications so that the suite-specific versions match. The software developer may increment the application-specific version number if no public interfaces of the application have changed. For example, application-specific improvements or bug fixes can be given a new version number where the suite-specific version number is the same but the application-specific version number increases.

Figure 6:
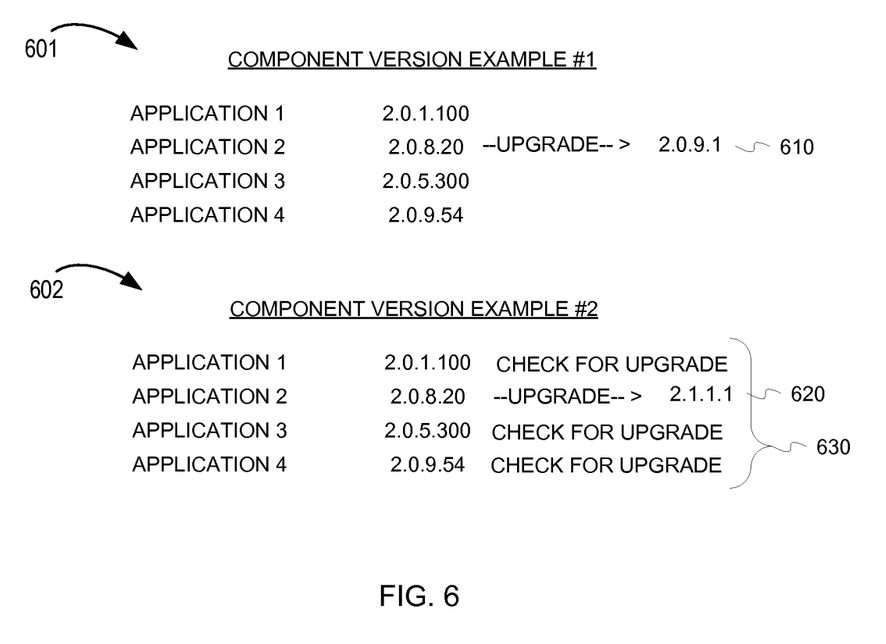
FIG. 6 depicts examples of version upgrades in accordance with an embodiment of this disclosure.

FIG. 6 depicts examples of version upgrades using the version numbering scheme described in FIG. 5. In FIG. 6, there are two examples: a first component version example 601 and a second component version example 602. In both examples, the starting version numbers of the component applications are the same. A first application is version 2.0.1.100 (having the same format as the example version number in FIG. 5). A second application is version 2.0.8.20. A third application is version 2.0.5.300. A fourth application is version 2.0.9.54. The major version number and minor version number have been defined as the suite-specific version for these examples. Therefore, all four of the applications have the same suite-specific version number "2.0."

In a first component version example 601, the second application has an upgrade available 610, from version 2.0.8.20 to 2.0.9.1. Because the suite-specific version number "2.0" is the same, the component manager is not required to upgrade the other application components. In the first component version example 601, for example, the second application may have some internal improvements or bug fixes which do not impact the compatibility with other components.

In the second component version example 602, the second application has a different upgrade available 620, from version 2.0.8.20 to 2.1.1.1. Noting that the suite-specific version number changed from 2.0 to 2.1, the component manager may check for upgrades to the other applications 630. If upgrades to the other applications are available, the component manager may include them in a list of selected applications to upgrade. Alternatively, in one embodiment, if upgrades to the other applications are not available, the component manager may consult a compatibility database to determine whether to proceed with the upgrade of the second application.

Figure 7:
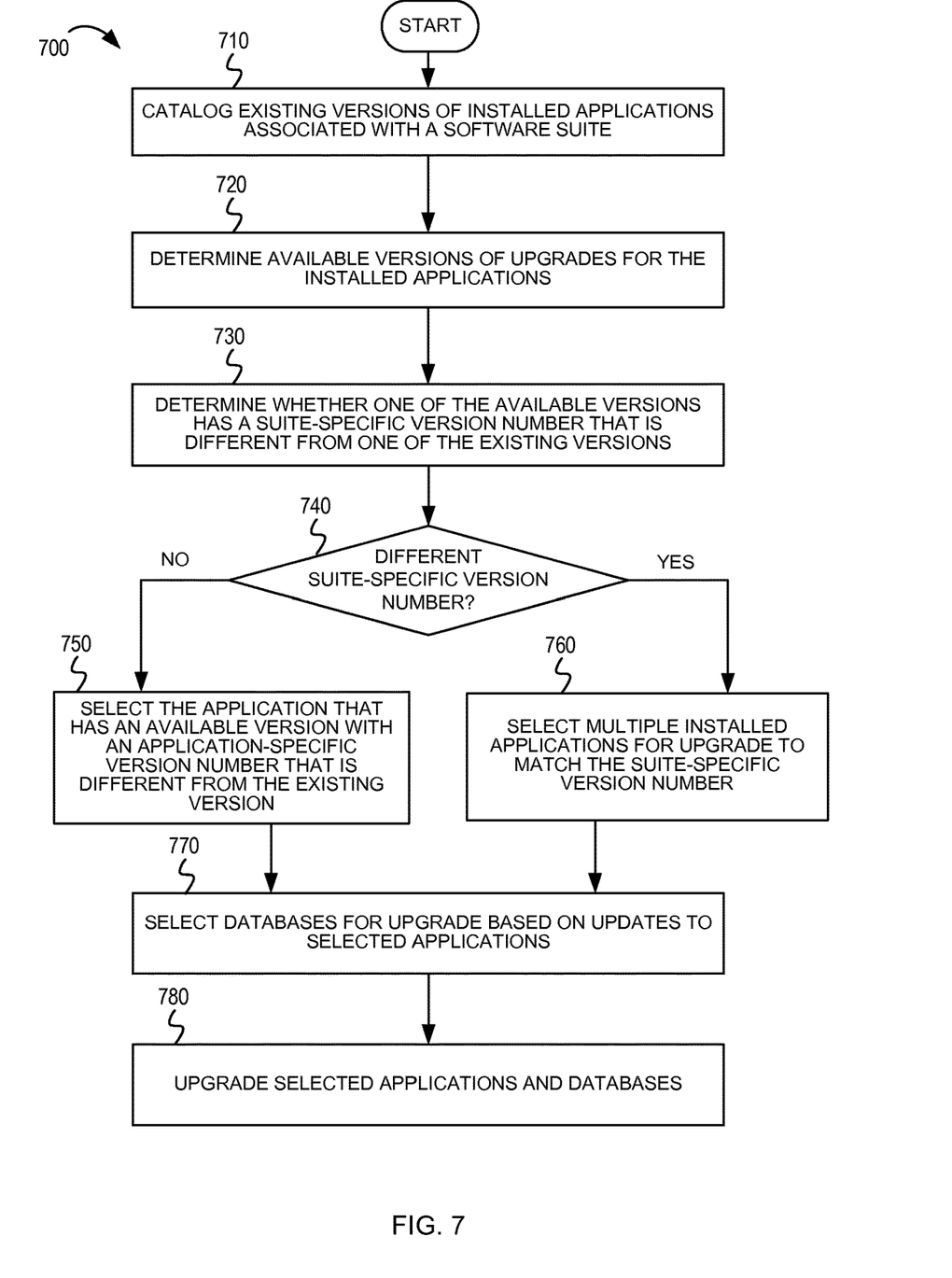
FIG. 7 depicts a flowchart with example operations for upgrading software components in accordance with an embodiment of this disclosure.

FIG. 7 depicts a flowchart 700 with example operations for upgrading software components in accordance with an embodiment of this disclosure.

At block 710, the component manager may catalog existing versions of installed applications associated with a software suite. For example, the component manager may retrieve a list of installed applications from an operating system resource, such as a package manager or application store. The component manager may compare the list of installed applications with a list of components associated with the software suite. If the list of installed applications doesn't have version numbers, the component manager may query the installed applications to determine the existing versions of the installed applications.

At block 720, the component manager may determine available versions of upgrades for the installed applications. In one embodiment, the component manager may query a centralized server for a list of current versions for applications associated with the software suite. The component manager may query the centralized server for particular applications, or may retrieve a full list of applications associated with the software suite.

At block 730, the component manager may determine whether one of the available versions has a suite-specific version number that is different from one of the existing versions. As in the second component version example 602 of FIG. 6, if the component manager determines that a first portion (the suite-specific version number) has changed for any of the applications, the component manager may investigate whether upgrades are needed for the other installed applications. The suite-specific version number may comprise the major version number 510 and minor version number 520 of the version number, or any other portion of the version number, in accordance with a version numbering scheme.

At decision 740, the flowchart 700 may branch depending on whether one of the available versions has a suite-specific version number that is different from one of the existing versions. If there is a different suite-specific version number, the flowchart 700 may branch to block 760. If none of the available versions have a different suite-specific version number, the flowchart 700 may branch to block 750.

At block 750, the component manager may select the application that has an available version with an application-specific version number that is different from the existing version. The application does not have a different suite-specific version number. It is noted that there may be more than one application that has application-specific version number changes, so block 750 may be used to select more than one application, as long as the applications do not have a different suite-specific version number compared to the existing versions of the already installed applications. From block 750, the flowchart 700 may continue to block 770, described below.

Returning to the branch from decision 740 to block 760, the component manager has determined that at least one of the available versions has a different suite-specific version number from the existing (already installed) version. At block 760, the component manager may select multiple installed applications for upgrade to match the suite-specific version number. In one embodiment, the component manager may select all of the components of the software suite to upgrade, such as a major software release.

At block 770, the component manager may select databases for upgrade based on updates to selected applications. Depending on which applications have been selected in blocks 750 and 760, there may be upgrades needed to one or more database components of the software suite. Compatibility of a database schema may be maintained using a database schema numbering scheme. Furthermore, if a database component is upgraded, the component manager may select additional applications (not shown) for upgrade if a database used by the additional applications is upgraded. In one embodiment, the database schema may be specific for each application. A change to a database version number may indicate that the database and the associated application should be upgraded. In one embodiment, database schemas do not trigger an upgrade in a different application unless the version for the application has changed.

At block 780, the component manager may upgrade selected applications and databases. Applications may be shut down or disabled during the upgrade process. A user interface may provide progress during the upgrade, and/or may provide a confirmation when the upgrade has completed.

Figure 8:
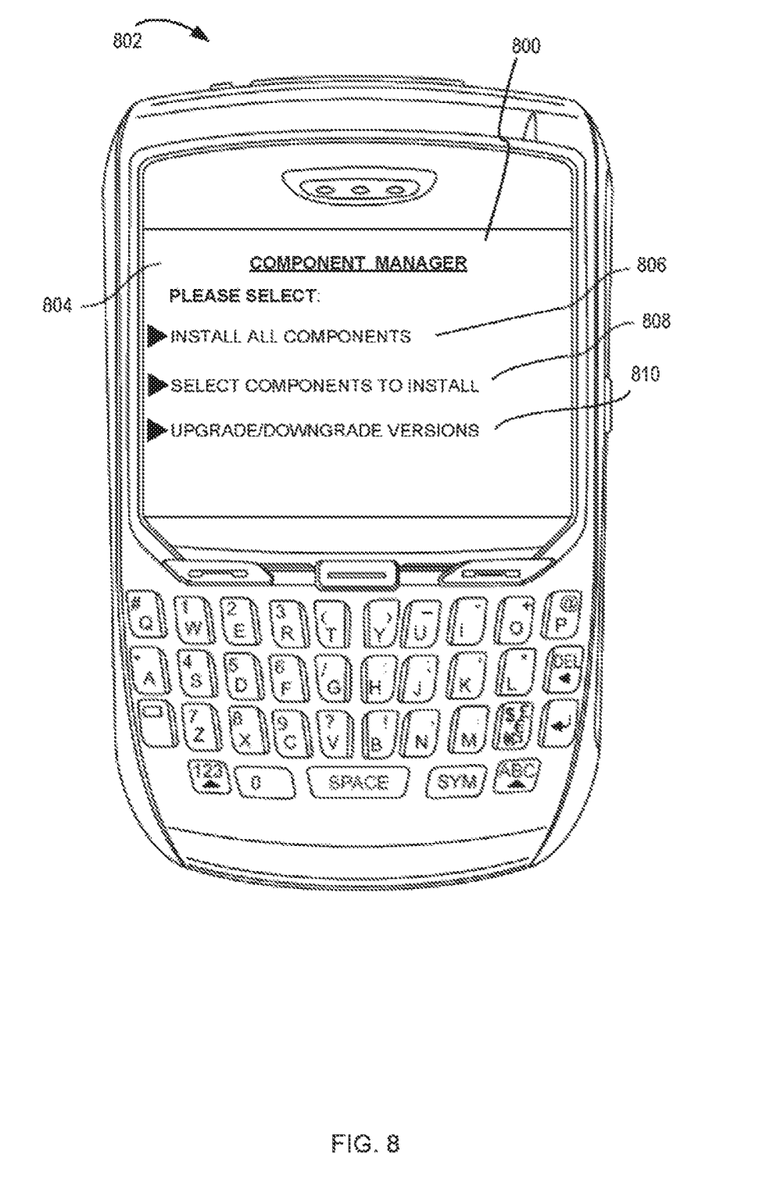
FIG. 8 depicts a user interface of a component manager in accordance with an embodiment of this disclosure.

In FIG. 8, shown is an example user interface 800 for a component manager in accordance with an embodiment of the present disclosure. In one embodiment, the user interface 800 is displayed to a device 802. The device 802 may represent any number of computing or communication devices produced and provided by manufacturers and service providers. For example, the device 802 may represent devices manufactured by any number of devices and may execute any number of operating systems. The user interface 800 may be representative of a screen dialog implemented on the device 802. In one embodiment, the user interface 800 may be produced by the component manager 804 executing on the device 802.

The user interface 800 may be configured to display a set of options. A selection of an option may be initiated based on selection of a specified button (hard button or soft button), icon, performing a gesture (e.g., performing a swiping motion), or so forth. In FIG. 8, a first example option 806 may receive input to initiate installation of all components of the software suite. Responsive to the first example option 806, the component manager 804 may proceed to download and install all the applications, databases, services, or other components that are available for the software suite.

A second example option 808 may receive input associated with selecting only a subset of the components associated with the software suite. Further user interface options may be provided to present options and receive selections from a user of the device. For example, the options may allow the user to select only particular applications, language packs, etc. that are available for the software suite.

A third example option 810 may receive input associated with upgrading or downgrading versions of software associated with the software suite. For example, the component manager 804 may check for upgrades responsive to receiving a selection of the third example option 810.

The component manager may be used to manage downgrades of the software suite in a variety of ways. In one embodiment, the component manager may be used to verify compatibility between a requested downgraded version of an application and any associated databases. For example, the component manager may check the database schema that is used with the selected downgraded application version. If the current database schema version is the same database schema used by the selected downgraded application version, then the downgrade may be performed while preserving data in the database. If the database schema versions are different (e.g., the downgraded application version is associated with a different database schema than currently used with the current application version), then the user may be given an option to proceed or cancel. In one embodiment, proceeding with the downgrade may result performing a rewrite of the database, in which case the current data will not be preserved during the downgrade. In one embodiment, downgrades may be restricted unless many components of the software suite are downgraded during the downgrade process.

The example sequence of operations described above are but one possible example of many possible sequences. Many other sequences are possible, with different operations and different ordering of operations. The embodiments are not limited to any particular ordering of operations.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 9:
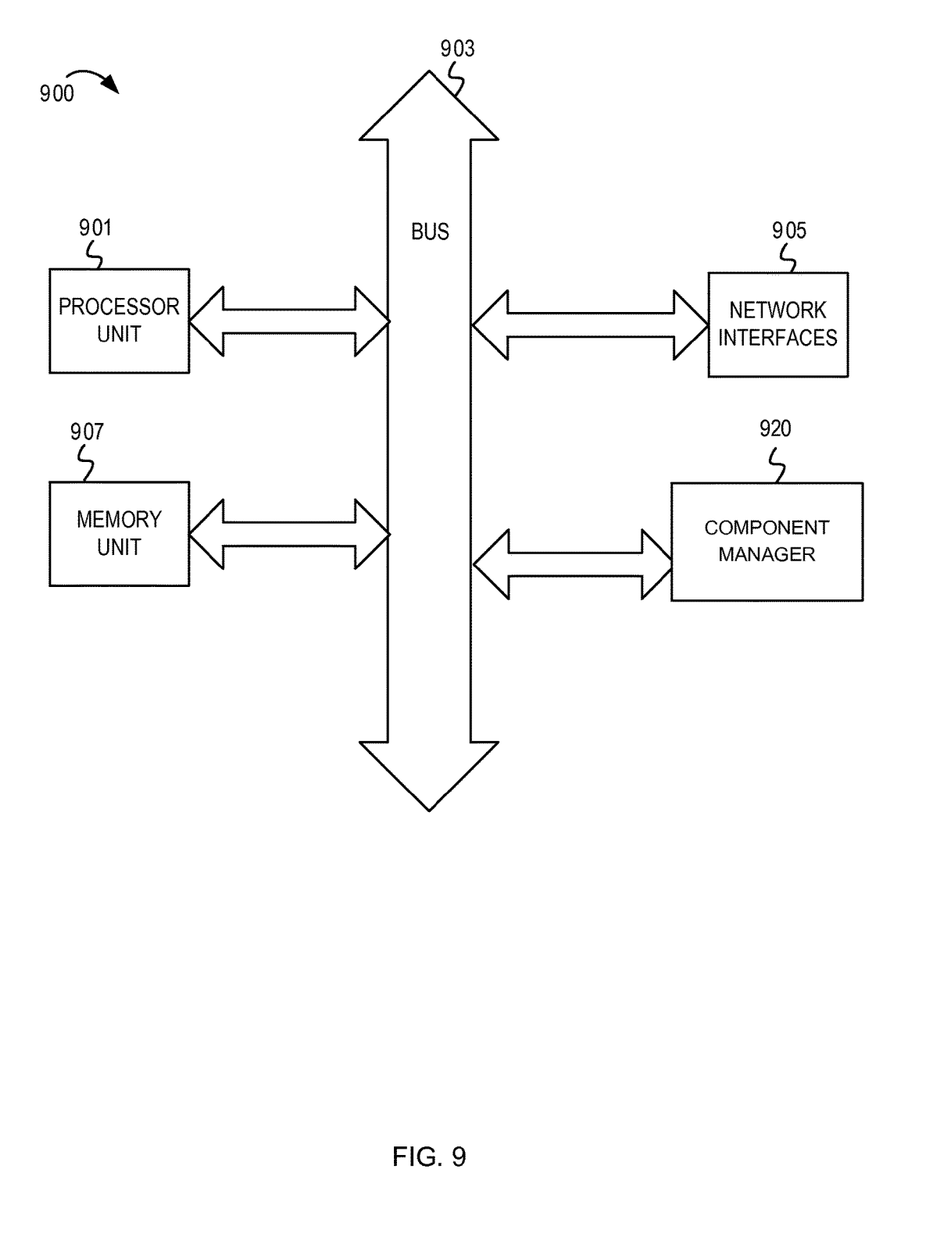
FIG. 9 depicts an example electronic device in accordance with an embodiment of this disclosure.

FIG. 9 depicts an example electronic device, according to some embodiments. FIG. 9 depicts an electronic device 900 that can be an example of the device 110, 802 depicted in FIGS. 2 and 8. The electronic device 900 includes a processor 901 (possibly including multiple processors, multiple cores, multiple nodes, and/or implementing multi-threading, etc.). The electronic device 900 includes a memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 903 (e.g., PCI, ISA, PCI-Express, Hyper-Transport®, InfiniBand®, NuBus, etc.), a network interface 905 (e.g., an ATM interface, an Ethernet interface, a Frame Relay interface, SONET interface, wireless interface, etc.), and optionally may include a storage device(s) (e.g., optical storage, magnetic storage, etc.). Some or all of the operations described herein may be implemented with code embodied in the memory and/or processor, co-processors, other cards, etc.

The electronic device 900 may also include a component manager 920. The component manager 920 may be installed on the electronic device (e.g., in memory 907) and executable on the processor 901 to perform the features of the foregoing figures. For example, the component manager 920 may be configured to maintain, install, and/or upgrade components of a software suite. The component manager 920 may utilize a version numbering scheme to determine whether various components are required to be upgraded in response to an upgrade in a first component.

Any one of these operations may be partially (or entirely) implemented in hardware and/or on the processor 901. For example, the operations may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901, the network interface 905, the memory 907, and the display 942 are coupled to the bus 903. Although illustrated as being coupled to the bus 903, the memory 907 may be coupled to the processor 901.

While the embodiments are described with reference to various implementations and exploitations, it will be understood that these embodiments are illustrative and that the scope of the subject matter is not limited to them. In general, techniques for intra-application permissions on electronic devices as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the subject matter.

What is claimed is:

1. A method performed by a mobile electronic device, the method comprising:

installing, on the mobile electronic device, a component manager via an application store of the mobile electronic device;

determining, at the component manager, a version of a first application and a version of a second application in a software suite installed on the mobile electronic device, wherein the versions of the first and second applications are indicated by a version numbering scheme designed to maintain compatibility between the first application in the software suite and the second application in the software suite, wherein at least one of the first application or the second application is a mobile application tailored to at least one of a size of a display screen on the mobile electronic device or hardware for the mobile electronic device, wherein the version numbering scheme defines at least:

a first suite-specific version number indicating a version of the software suite to which the first application belongs;

a second suite-specific version number indicating a version of the software suite to which the second application belongs;

a first application-specific version number for the first application in the software suite; and a second application-specific version number for the second application in the software suite;

determining, at the component manager, whether to install a first application upgrade corresponding to the first application on the mobile electronic device based at least in part on a determination, using at least the version numbering scheme, of whether operation of the version of the first application upgrade is compatible with operation of the version of the second application in the software suite; and installing, by the component manager, the first application upgrade when the version numbering scheme indicates that the version of the first application upgrade is compatible with operation of the version of the second application in the software suite, wherein the component manager determines that the version of the first application upgrade is compatible with the version of the second application if the first suite-specific version number is the same as the second suite-specific version number of the second application, wherein determining whether to install the first application upgrade corresponding to the first application comprises:

identifying a change to a database schema associated with the software suite; and    selecting the first application upgrade to install based on the change to the database schema.

2. The method of claim 1, further comprising: upgrading a database component of the software suite in response to installing the first application upgrade.

3. The method of claim 1, wherein determining the version of the first application and the version of the second application in the software suite comprises:

querying a list of installed applications on the mobile electronic device; and    cataloging the version of the first application and the version of the second application in the software suite.

4. The method of claim 1, wherein installing the first application upgrade comprises downloading the first application upgrade via a server that is different from the application store, wherein the application store is integrated with a mobile operating system of the mobile electronic device.

5. The method of claim 1, further comprising independently upgrading the first application to the first application upgrade if the first application-specific version number of the first application changes and the first suite-specific version number of the first application upgrade does not change.

6. The method of claim 1, further comprising upgrading a plurality of applications in the software suite when a suite-specific version number changes for one of the applications in the software suite.

7. The method of claim 1, wherein the determination of whether the version of the first application upgrade is compatible with the version of the second application comprises a comparison of the first and second suite-specific version numbers, and wherein the component manager determines that the version of the first application upgrade is not compatible with the version of the second application if the first suite-specific version number is different than the second suite-specific version number of the second application.

8. A mobile electronic hardware device, comprising:

a hardware processor;

an application store installed on the mobile electronic hardware device and executable on the hardware processor, the application store configured to install a component manager on the mobile electronic hardware device; and the component manager installed on the mobile electronic hardware device and executable on the hardware processor, the component manager configured to:

determine, at the component manager, a version of a first application and a version of a second application in a software suite installed on the mobile electronic hardware device, wherein the versions of the first and second applications are indicated by a version numbering scheme designed to maintain compatibility between the first application in the software suite and the second application in the software suite, wherein at least one of the first application or the second application is a mobile application tailored to at least one of a size of a display screen on the mobile electronic device or hardware for the mobile electronic device, wherein the version numbering scheme defines at least:

a first suite-specific version number indicating a version of the software suite to which the first application belongs;

a second suite-specific version number indicating a version of the software suite to which the second application belongs;

a first application-specific version number for the first application in the software suite; and       a second application-specific version number for the second application in the software suite;

determine whether to install a first application upgrade corresponding to the first application, based at least in part on a determination, using at least the version numbering scheme, of whether operation of the version of the first application upgrade is compatible with operation of the version of the second application in the software suite; and    install the first application upgrade when the version numbering scheme indicates that the version of the first application upgrade is compatible with operation of the version of the second application in the software suite, wherein the component manager determines that the version of the first application upgrade is compatible with the version of the second application if the first suite-specific version number is the same as the second suite-specific version number of the second application, wherein determining whether to install the first application upgrade corresponding to the first application comprises:

identifying a change to a database schema associated with the software suite; and    selecting the first application upgrade to install based on the change to the database schema.

9. The mobile electronic hardware device of claim 8, wherein the component manager is further configured to:

upgrade a database component of the software suite in response to installing the first application upgrade.

10. The mobile electronic hardware device of claim 8, wherein the component manager is further configured to:

determine the versions of the first and second applications by querying a list of installed applications on the mobile electronic hardware device; and catalog the version of the first application and the version of the second application in the software suite.

11. The mobile electronic hardware device of claim 8, wherein installing the first application upgrade comprises downloading the first application upgrade via a server that is different from the application store, wherein the application store is integrated with a mobile operating system of the mobile electronic device.

12. The mobile electronic hardware device of claim 8, wherein the first application can be independently upgraded to the first application upgrade if the first application-specific version number of the first application changes and the first suite-specific version number of the first application does not change.

13. The mobile electronic hardware device of claim 8, wherein a plurality of applications in the software suite are upgraded when a suite-specific version number changes for one of the applications in the software suite.

14. The mobile electronic hardware device of claim 8, wherein the determination of whether the version of the first application upgrade is compatible with the version of the second application comprises a comparison of the first and second suite-specific version numbers, and wherein the component manager determines that the version of the first application upgrade is not compatible with the version of the second application if the first suite-specific version number is different than the second suite-specific version number of the second application.

15. A non-transitory machine-readable medium having instructions stored therein, which when executed by a processor causes the processor to perform operations that comprise:
- installing, on a mobile electronic device, a component manager via an application store of the mobile electronic device;
- determining, at the component manager, a version of a first application and a version of a second application in a software suite installed on the mobile electronic device, wherein the versions of the first and second applications are indicated by a version numbering scheme designed to maintain compatibility between the first application in the software suite and the second application in the software suite, wherein at least one of the first application or the second application is a mobile application tailored to at least one of a size of a display screen on the mobile electronic device or hardware for the mobile electronic device, wherein the version numbering scheme defines at least:
  - a first suite-specific version number indicating a version of the software suite to which the first application belongs;
  - a second suite-specific version number indicating a version of the software suite to which the second application belongs;
  - a first application-specific version number for the first application in the software suite; and
  - a second application-specific version number for the second application in the software suite;
- determining, at the component manager, whether to install a first application upgrade corresponding to the first application on the mobile electronic device based at least in part on a determination, using at least the version numbering scheme, of whether operation of the version of the first application upgrade is compatible with operation of the version of the second application in the software suite; and
- installing, by the component manager, the first application upgrade when the version numbering scheme indicates that the version of the first application upgrade is compatible with operation of the version of the second application in the software suite,
- wherein the component manager determines that the version of the first application upgrade is compatible with the version of the second application if the first suite-specific version number is the same as the second suite-specific version number of the second application,
- wherein determining whether to install the first application upgrade corresponding to the first application comprises:
  - identifying a change to a database schema associated with the software suite; and
  - selecting the first application upgrade to install based on the change to the database schema.

* * * * *